United States Patent Office 3,257,405
Patented June 21, 1966

3,257,405
PREPARATION OF QUINACRIDONE PIGMENTS
Herman Gerson, New York, N.Y., and John F. Santimauro, Wyckoff, and Vincent C. Vesce, Saddle River, N.J., assignors to Allied Chemical Corporation, New York, N.Y., a corporation of New York
No Drawing. Filed Oct. 2, 1961, Ser. No. 141,951
25 Claims. (Cl. 260—279)

This application is a continuation-in-part of our application Serial No. 810,214, filed May 1, 1959.

This invention relates to the preparation of quinacridones and pertains more specifically to a novel and highly useful process whereby linear quinacridones are obtained more easily than has heretofore been thought possible, in substantially quantitative yields and in a form directly suitable, without special conditioning treatment, for use as color pigments.

The quinacridone structure:

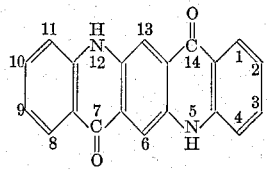

is known to result from the ring closure, with elimination of two molecules of water, of a 2,5-diarylamino terephthalic acid. This reaction, however, has heretofore required (at least in the case of the 2,5-dianilino terephthalic acid to give the parent linear quinacridone of the above formula) high temperature melt fusion with boric acid and has given low yields of product.

More recently it has been proposed to obtain linear quinacridone by starting with the diethyl ester of di-2,5 anilino-3,6-dihydroterephthalate and cyclizing it under non-oxidizing conditions to give dihydro-quinacridone, which is then oxidized to the desired linear quinacridone. While this method is perhaps more convenient than the melt fusion process, it suffers from the disadvantages of requiring maintenance of a non-oxidizing atmosphere during ring closure and a separate oxidation step.

It is, accordingly, the principal object of this invention to provide a more efficient and economical method of obtaining quinacridones in pigmentary form. Other related and more detailed objects will be apparent from the description of the invention to follow.

In accordance with this invention quinacridone color pigments are easily and economically prepared, in substantially quantitative yields by heating a mixture of a 2,5-diarylamino terephthalic acid with a substantial amount of a polyphosphoric acid equivalent, on analysis, to at least 105% orthophosphoric acid ($H_3PO_4$), as dehydrating or ring closing agent, for a time sufficient to effect ring closure and produce the quinacridone structure, which time can be even less than an hour, and then separating the quinacridone product, in the form of finely-divided intensely colored pigments, from the reaction mixture.

It is quite surprising that the acid ring closes so completely and rapidly using polyphosphoric acid as ring-closing agent, since many of the conventional dehydrating and ring-closing agents are not effective; for example, heating the acid with $P_2O_5$ in a solvent gives only a very low yield of a crude product, and the use of 100% $H_3PO_4$ is not effective at all. It is also surprising that the quinacridone is produced directly in pigmentary form suitable for commercial use as color pigment since the known commercial quinacridone pigments are apparently the result of extensive milling treatments conducted on the crude quinacridone after it is chemically formed.

In the practice of our invention, it is essential to use as ring closing agent, a polyphosphoric acid which analyzes at least 105% $H_3PO_4$. The polyphosphoric acid of commerce (sometimes also called tetraphosphoric acid or by various trademark names), which is quite effective, is a clear, colorless, viscous hygroscopic liquid with a specific gravity of approximately 2.060 at 20° C., having an $H_3PO_4$ equivalent of about 83% $P_2O_5$ or about 115% $H_3PO_4$. Its approximate composition is:

|  | Percent |
| --- | --- |
| Orthophosphoric acid | 5.7 |
| Pyrophosphoric acid | 21.4 |
| Triphosphoric acid | 18.0 |
| Tetraphosphoric acid | 13.4 |
| Pentaphosphoric acid | 11.4 |
| Hexaphosphoric acid | 9.6 |
| Heptaphosphoric acid | 7.1 |
| Nonaphosphoric acid | 6.5 |
| Higher polyphosphoric acids | |

Other polyphosphoric acids whose composition includes higher percentages of acids other than orthophosphoric acid, and therefore analyze as high as 120% $H_3PO_4$, are similar in properties and are equally effective. It has also been found that the commercial material may be diluted with the ordinary syrupy $H_3PO_4$ (85%) to reduce the $H_3PO_4$ content of the mixture to any desired value between 105% and 115%. Further dilution so as to give an $H_3PO_4$ content below 105%, however, destroys the effectiveness of the material for use in this invention.

The amount of polyphosphoric acid used is generally at least twice as much, by weight, as that of the 2,5-diarylamino terephthalic acid and preferably the amount of polyphosphoric acid is from 4 to 7 times that of the terephthalic acid. Lower amounts of the polyphosphoric acid are not as effective in producing ring closure within a reasonable time but higher amounts up to 20 times that of the terephthalic acid or more are usable and offer the advantage of producing a more fluid reaction mass, although this advantage is generally not sufficient to warrant the added cost. The polyphosphoric acid can all be added initially to the reaction mixture or, alternatively, portions thereof may be added in stages after an initial addition and heating period. It is unnecessary to use any solvent or diluent in the reaction mass, although an inert diluent can be present without destroying the reaction.

It is also unnecessary that the mixtures be agitated during the heating period since static conditions as are present during oven heating are effective. However, it is preferred that the mixture be agitated as in a Werner Pfleider mixer or by other agitating device, and that sufficient polyphosphoric acid be used to facilitate stirring or other agitation.

The temperature at which the mixture of 2,5-diarylamino terephthalic acid and polyphosphoric acid is heated in accordance with this invention may be varied over a wide range while the time of heating to effect ring closure varies inversely with the temperature. The temperature may be as low as about 50° C., in which event complete ring closure requires several days, or as high as about 200° C., in which event ring closure occurs in less than an hour. It is generally preferred to heat the mixture at a temperature of 85 to 120° C. for a time, to complete ring closure, of 1 to 72 hours.

After the heating to effect ring closure reaction the quinacridone produced is separated from the reaction mixture in the form of finely-divided intensely colored pigment. This may be accomplished in a variety of ways.

One simple method is to cool the mixture, drown it by adding water, stir (with or without boiling or reflux) and filter, this simple procedure giving an excellent pigment.

Another method, quite useful in improving or finishing the pigment to extremely attractive shades is to precipitate the quinacridones from the polyphosphoric acid reaction masses by means of a water-miscible organic liquid, particularly an alcohol such as methanol, ethanol, isopropanol, glycerol, diacetone alcohol, diethylene glycol or the like or a ketone such as acetone, or mixtures thereof with water or with other organic liquids (an example of which is the alcohol base solvent known as "Solox" which contains 100 parts denatured alcohol, 5 parts ethyl acetate and 1 part aviation gasoline). When finishing with such organic liquids, particularly methanol, it is desirable first to cool the reaction mass, for example below 60° C., and to reduce the polyphosphoric acid content of the reaction mass to less than 110% $H_3PO_4$, and preferably to 103%–105% $H_3PO_4$, with addition of water or ordinary phosphoric acid to lower the viscosity of the mass and to prevent reaction of the polyphosphoric acid with the methanol. It is also, of course, desirable in many instances to reslurry the pigment one or more times with dilute aqueous acid or dilute aqueous alkali, and wash it thoroughly, to remove any traces of impurities, before final filtration and drying.

It will be evident to those skilled in the art that the above procedure for preparing or finishing quinacridones directly in the pigment form by precipitating the quinacridones from polyphosphoric acid also can be employed for the preparation or finishing of quinacridone pigments from quinacridones produced by other methods than that set out above. Thus, various quinacridones produced, for example, by separately ring-closing 2,5-diarylamino terephthalic acids in the above manner or in the manner disclosed by Liebermann in Annalen, vol. 518, pages 245 ff., in other known ways, or in the manner disclosed in copending application Serial No. 800,092, filed March 18, 1959, or produced in other ways, such as the method of U.S. Patents 2,821,529 and 2,821,530, can be dissolved in polyphosphoric acids, such as those referred to above, and then precipitated in the above manner, especially with the aid of water-miscible organic liquids to produce pigments of extremely attractive shades.

The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

*Example 1*

100 parts of polyphosphoric acid (115% as $H_3PO_4$) are thoroughly mixed with 20 parts of 2,5-dianilino terephthalic acid and the mixture is then heated with agitation to a temperature of 85° for a total of about 24 hours. The reaction mixture is cooled and when its temperature is below 65° there is added gradually with stirring 250 parts of water, after which the mass is drowned with an additional 1000 parts of water and slurried for an hour, boiled for a half hour and then filtered. The filter cake is washed with water, reslurried in 1000 parts of water to which is added 20 parts of 50% caustic soda solution, boiled for an hour, again filtered, washed and dried.

There is obtained 16.8 parts (93.7% yield) of linear quinacridone in the form of a finely-divided red pigment powder, which when dispersed in oil yields an intensely colored bluish red pigment of high tinctorial strength and attractive shade. It is a very durable and highly stable non-bleeding pigment, with properties not generally found in the shade range. It has especial utility for uses where it may be exposed to light and where stability to chemicals, solvents, acids and alkalis is required as in automobile finishes and the like.

*Example 2*

The general procedure of Example 1 is repeated except that the reaction mixture, after the heating cycle, is first mixed with 100 parts of 85% $H_3PO_4$, drowned into 400 parts acetone, slurried and refluxed for an hour then drowned into 1000 parts water, boiled for an hour and filtered, the filter cake then being treated as in Example 1. The yield is 93% of theory and the product is an excellent linear quinacridone pigment of bluish red shade.

*Examples 3 to 7*

In each of these examples linear quinacridone pigment is prepared by mixing 20 parts of 2,5-dianilino terephthalic acid with 100 parts of each of several polyphosphoric acids with various equivalents of $H_3PO_4$, prepared by mixing 85% $H_3PO_4$ with $P_2O_5$ to the proper $H_3PO_4$ equivalent or by diluting commercial polyphosphoric acid (115% $H_3PO_4$) with 85% $H_3PO_4$ to the proper $H_3PO_4$ equivalent. The mixtures are heated to 110 to 120° C. for about 8 hours. The reaction mixtures are then diluted with 85% $H_3PO_4$, as in Example 2, and then drowned into 300 parts methanol, refluxed for one hour, then drowned into 1000 parts water, boiled for one-half hour, then filtered, washed and dried as in Example 1.

The following table gives the $H_3PO_4$ equivalent of the polyphosphoric acid used and the yield obtained.

| Example No. | Polyphosphoric Acid $H_3PO_4$ Percent | Yield (Percent) |
| --- | --- | --- |
| 3 | 119 | 91.7 |
| 4 | 117 | 92 |
| 5 | 115 | 92 |
| 6 | 110 | 91.6 |
| 7 | 105 | 63.2 |

When the example is repeated using acid equivalent to 100% $H_3PO_4$, ring closure does not occur and no yield is secured.

In each case the linear quinacridone is obtained in the form of a finely divided red-violet pigment of unusually attractive shade and excellent properties. When subjected to X-ray analysis by the known powder technique, in which the pigment in powder form is subjected to CuK alpha radiation and the intensity of the diffracted ray on the vertical axis is measured in relation to the angle of diffraction on the horizontal axis, using a Geiger counter, and the angle of diffraction measurements are converted to interplanar spacings expressed in Angstrom units, it is characterized by an X-ray diffraction pattern having (in decreasing order of relative intensity) a line of high intensity at 3.3 A., two lines of less high intensity at 15.2 A. and 5.6 A., two equal lines of moderate intensity at 4.1 A. and 7.6 A., and at least two lines of lesser intensity at 3.8 A. and 6.4 A. It is a feature of the invention that the tinctorial strength of the resulting pigments is 25% to 30% greater than the red-violet quinacridones obtained by previous methods.

*Examples 8 to 13*

In these examples various amounts of 115% polyphosphoric acid are mixed with 2,5-dianilino terephthalic acid and the resulting mixtures heated under various conditions, as shown below. In each case the reaction mixture is treated as in Examples 3 to 7, with $H_3PO_4$ and methanol, and in each case an excellent linear quinacridone in the form of finely divided red violet pigment is obtained in the yield indicated below.

| Ex. No. | Ratio Polyphosphoric Acid to Terephthalic Acid | Heating Temp. and Time | Heating Conditions | Yield (Percent) |
|---|---|---|---|---|
| 8 | 2-1 | 85° C.—8 hrs | Oven | 70 |
| 9 | 3-1 | 85° C.—24 hrs | do | 93 |
| 10 | 5-1 | 180° C.—45 mins | Agitation | 93.2 |
| 11 | 5-1 | 85° C.—24 hrs | do | 95 |
| 12 | 5-1 | 60° C.—7 days | Oven | 45 |
| 13 | 20-1 | 100° C.—3 hrs | Agitation | 91 |

Each of Examples 1 to 13 above has illustrated the preparation of linear quinacridone by the process of this invention, utilizing as the starting reactant 2,5-dianilino-terephthalic acid. It is to be understood, however, that the invention is by no means limited to the use of this specific starting reactant and rather includes the use of any 2,5-diarylamino terephthalic acid to produce the corresponding quinacridone.

The particular 2,5-diarylamino terephthalic acid used may be prepared as known to the art and may be derived, for example, from various primary aromatic amines other than aniline (as in the case of 2,5-dianilino terephthalic acid) such as o-, m- and p-toluidine, and various xylidines, alpha and beta naphthylamine, the various ethyl, propyl and butyl anlines and other aromatic amines made up of aromatic hydrocarbon structure attached to the amine group, as well as from the various alkoxy substituted primary aromatic amines such as o-, m- and p-anisidines, and the various halogen substituted primary aromatic amines such as o-, m- and p-chloroaniline, p-bromoaniline, p-iodoaniline, p-fluoroaniline, the dichloro, diiodo, difluoro and dibromo anilines and the corresponding halo derivatives of the toluidines, xylidines, etc.

The following tabulated Examples 14 to 19 illustrate the preparation of quinacridone pigments using 2,5-diarylamino terephthalic acids other than 2,5-dianilino terephthalic acid. In each case the reaction procedure is as set forth in Examples 3 to 7 and in each case the quinacridone is obtained form.

The polyphosphoric acid solution was formed by stirring the quinacridone with the polyphosphoric acid at 85°–110° for 4 to 18 hours. When all was dissolved, the solution was cooled to 60° and then diluted with 100 parts of phosphoric acid (85%) over the course of two hours while cooling further to 30°. The solution was then drowned into 500 parts of methanol at room temperature with stirring; heated to reflux and refluxed for an hour; drowned into 600 parts of water at room temperature; heated to 60° and held at said temperature for a half hour; filtered; washed acid-free; dried and ground.

The resulting product is a brilliant red-violet pigment of high tinctorial strength having the characteristics of the products of above Examples 3 to 7.

*Examples 21 and 22*

The process of Example 20 was repeated, employing as starting materials, respectively, a commercial brilliant red quinacridone pigment ("Monastral" Red B) and a quinacridone obtained by water precipitation from the reaction mixture resulting from the ring-closure of 2,5-diphenyl-amino terephthalic acid in polyphosphoric acid (cf. Example 1). The resulting products were brilliant red violet pigments similar to those of Examples 3 to 7 and 20.

From the foregoing description of our invention it is apparent that we provide an economical and efficient method for the preparation of quinacridone pigments of a variety of colors, all of which are exceedingly useful for the many purposes for which color pigments are conventionally employed. It is to be understood that the examples given are illustrative and that changes can be made without departing from the scope of the invention.

We claim:

1. The process of preparing a linear quinacridone in the form of a finely-divided pigment which comprises precipitating a linear quinacridone from a polyphosphoric acid by diluting with a water-miscible organic liquid.

2. The process of preparing a linear quinacridone in the form of a finely-divided pigment which comprises diluting a solution of a linear quinacridone in a polyphosphoric acid with a water-miscible alcohol to a sufficient extent to precipitate the quinacridone.

3. The process of preparing a linear quinacridone in

| Example No. | 2,5-diaryl Amino Terephthalic Acid Used | Quinacridone Pigment Obtained | Color of Pigment | Yield (percent) |
|---|---|---|---|---|
| 14 | 2,5-di-p-toluidino terephthalic acid | 2,9-dimethyl quinacridone | Bluish red | 94 |
| 15 | 2,5-di-o-toluidino terephthalic acid | 4,11-dimethyl quinacridone | Bright yellowish red | 88 |
| 16 | 2,5-di-p-anisidino terephthalic acid | 2,9-dimethoxy quinacridone | Red violet | 68 |
| 17 | 2,5-di-p-chloro anilino terephthalic acid | 2,9-dichloro quinacridone | Bluish red | 92 |
| 18 | 2,5-di-(3-chloro-4-methyl) anilino terephthalic acid | 2,9-dimethyl-3,10-dichloro quinacridone | do | 90 |
| 19 | Di-α-naphthylamino terephthalic acid | 3,4;10,11-dibenzo quinacridone | Brown | 83 |

*Example 20*

A solution of quinacridone in polyphosphoric acid was prepared by dissolving 25 parts of quinacridone in 200 parts of commercial polyphosphoric acid having an $H_3PO_4$ equivalent of 83%–85% $P_2O_5$. The quinacridone had been obtained in accordance with the procedure of Liebermann (Annalen, vol. 518, pages 249/250) by grinding 15 parts of 2,5-dianilino-terephthalic acid with 75 parts of boric acid in a mortar; heating the resulting mixture in a molten metal bath, first to 260–270° without stirring, and then, after five minutes at said temperature with slow stirring to 320–330°, and finally for an hour and a half at 320–330°; cooling the melt and extracting it from the reaction vessel with hot water, screening the resulting slurry through a 40-mesh screen and grinding the residue and adding it to the slurry; adding water to make up the volume of the slurry to 2,000 parts; alkalizing the slurry by addition of 225 parts of 50% aqueous sodium hydroxide; heating to boiling and boiling for an hour; filtering; washing free of alkali; drying at 140° F., and grinding.

the form of a finely-divided pigment which comprises diluting a solution of a linear quinacridone in a polyphosphoric acid with a water-miscible alcohol selected from the group consisting of methanol, ethanol, isopropanol, glycerol, diacetone alcohol and diethylene glycol, to a sufficient extent to precipitate the quinacridone.

4. The process of preparing a linear quinacridone in the form of a finely-divided pigment which comprises diluting a solution of a linear quinacridone in a polyphosphoric acid with methanol to a sufficient extent to precipitate the quinacridone.

5. The process of preparing a linear quinacridone in the form of a finely-divided pigment of high tinctorial strength from a solution thereof in a polyphosphoric acid equivalent to at least 110% orthophosphoric acid which comprises reducing the content of polyphosphoric acid in the solution to less than 110% orthophosphoric acid by mixing the solution with a member of the group consisting of water and ortho-phosphoric acid, then diluting further with a water-miscible organic liquid to effect precipitation of the quinacridone.

6. The process of preparing a linear quinacridone in the form of a finely-divided pigment of high tinctorial strength from a solution thereof in a polyphosphoric acid as defined in claim 3 which comprises reducing the polyphosphoric acid content of said solution by mixing the solution with a member of the group consisting of water and aqueous ortho-phosphoric acid, before diluting with methanol.

7. The process of preparing linear quinacridone in the form of a finely-divided pigment which comprises precipitating linear quinacridone from a polyphosphoric acid by diluting with a water-miscible organic liquid, and separating the quinacridone precipitate from the remaining liquid.

8. The process of preparng linear quinacridone in the form of a finely-divided red-violet pigment which comprises diluting a solution of linear quinacridone in a polyphosphoric acid with methanol to a sufficient extent to precipitate the quinacridone, and separating the quinacridone precipitate from the remaining liquid.

9. The process of preparing a linear quinacridone in the form of a finely-divided pigment which comprises:
    forming a solution of a linear quinacridone in a polyphosphoric acid equivalent to less than 110% orthophosphoric acid,
    diluting the resulting solution at a temperature below 60° C. with a water-miscible organic liquid, to effect precipitation of the quinacridone,
    heating the resulting mixture under refluxing conditions, and
    recovering the resulting quinacridone precipitate.

10. The process of preparing linear quinacridone in the form of a finely-divided pigment of high tinctorial strength which comprises:
    forming a solution of linear quinacridone in a polyphosphoric acid equivalent to less than 110% orthophosphoric acid,
    diluting the resulting solution at a temperature below 60° C. with a water-miscible alcohol, to effect precipitation of the quinacridone,
    drowning the resulting mixture in water, and
    separating the quinacridone precipitate from the remaining liquid.

11. The process of preparing linear quinacridone in the form of a finely-divided red-violet pigment of high tinctorial strength which comprises:
    forming a solution of linear quinacridone in a polyphosphoric acid equivalent to less than 110% orthophosphoric acid,
    drowning the resulting solution at a temperature below 60° C. in methanol to effect precipitation of the quinacridone, and
    recovering the resulting quinacridone pigment.

12. The process of preparing linear quinacridone in the form of a finely-divided red-violet pigment of high tinctorial strength which comprises:
    forming a solution of linear quinacridone in a polyphosphoric acid equivalent to less than 110% orthophosphoric acid,
    drowning the resulting solution at a temperature below 60° C. in methanol to effect precipitation of the quinacridone,
    heating the resulting mixture under refluxing conditions,
    drowning the resulting mixture in water, and
    separating the quinacridone pigment from the remaining liquid.

13. In the process of preparing a quinacridone pigment which comprises forming a linear quinacridone in a polyphosphoric acid reaction medium, the improvement which comprises recovering the quinacridone in finely-divided pigment form from the reaction medium by diluting the reaction medium with a water-miscible organic liquid.

14. The process of claim 13 wherein the organic liquid is an alcohol.

15. The process of claim 13 wherein the organic liquid is methanol.

16. In the process of preparing a quinacridone pigment which comprises forming a linear quinacridone in a polyphosphoric acid reaction medium, the improvement which comprises reducing the content of polyphosphoric acid in the resulting reaction mixture by diluting the reaction mixture with a member of the group consisting of water and aqueous orthophosphoric acid, further diluting the reaction mixture with a water-miscible organic liquid, and recovering the quinacridone in the form of a finely-divided pigment of high tinctorial strength.

17. The improvement in the process of preparing linear quinacridone in pigment form by ring closure of 2,5-dianilino-terephthalic acid, wherein the 2,5-dianilino-terephthalic acid is heated with a polyphosphoric acid equivalent to at least 105% orthophosphoric acid to effect the ring closure, which comprises recovering the quinacridone from the resultant reaction mixture in the form of a finely-divided pigment of high tinctorial strength by diluting with a water-miscible organic liquid, and separating the quinacridone precipitate from the remaining liquid.

18. The improvement in the process of preparing linear quinacridone in pigment form by ring closure of 2,5-dianilino-terephthalic acid, wherein the dianilino-terephthalic acid is heated with a polyphosphoric acid equivalent to at least 105% orthophosphoric acid to effect the ring closure, which comprises recovering the quinacridone from the resultant reaction mixture in the form of a finely-divided pigment of high tinctorial strength by cooling the reaction medium to below 65° C., diluting with methanol, and separating the quinacridone precipitate from the remaining liquid.

19. The process of preparing a quinacridone pigment which comprises heating to a temperature of about 85 to 120° C. a mixture of a 2,5-diarylamino-terephthalic acid with 4 to 7 times as much by weight of a polyphosphoric acid equivalent to 110 to 120% orthophosphoric acid for a time sufficient to effect ring closure of the said 2,5-diarylamino terephthalic acid and produce a reaction mixture containing quinacridone, adding orthophosphoric acid to the reaction mixture, cooling to below 65° C., drowning the resultant mixture in methanol, refluxing the drowned mixture, and filtering off a quinacridone in the form of a finely-divided pigment of high tinctorial strength.

20. The process of preparing a quinacridone pigment which comprises heating to a temperature of about 85 to 120° C. a mixture of a 2,5-diarylamino terephthalic acid with 4 to 7 times as much by weight of a polyphosphoric acid equivalent to 110 to 120% orthophosphoric acid for a time sufficient to effect ring closure of the said 2,5-diarylamino terephthalic acid and produce a reaction mixture containing quinacridone, adding orthophosphoric acid to the reaction mixture, cooling to below 65° C. drowning the resultant mixture in a water miscible organic liquid, refluxing the drowned mixture, and filtering off a quinacridone in the form of a finely-divided pigment of high tinctorial strength.

21. The process of claim 1 wherein the quinacridone is selected from the group consisting of quinacridone, 2,9-dimethyl quinacridone, 4,11-dimethyl quinacridone, 2,9-dimethoxy quinacridone, 2,9-dichloro quinacridone and 2,9-dimethyl-3,10-dichloro quinacridone.

22. The process of claim 2 wherein the quinacridone is 2,9-dimethyl quinacridone.

23. The process of claim 17 wherein the quinacridone is selected from the group consisting of quinacridone, 2,9-dimethyl quinacridone, 4,11-dimethyl quinacridone, 2,9-dimethoxy quinacridone, 2,9-dichloro quinacridone and 2,9-dimethyl-3,10-dichloro quinacridone and the water-miscible liquid is an alcohol.

24. The process of claim 17 wherein the quinacridone is 2,9-dimethyl quinacridone and the water-miscible liquid is methanol.

25. In a process for the regeneration of linear quinacridone from its solution in polyphosphoric acid to a pigment in small particle size, the improvement which consists of precipitating the pigment from the acid solution by diluting the acid rapidly with a lower alkanol followed by refluxing.

References Cited by the Examiner

UNITED STATES PATENTS

| | | | |
|---|---|---|---|
| 2,611,771 | 9/1952 | Marnon | 260—279 |
| 2,821,529 | 1/1958 | Struve | 260—279 |
| 2,893,994 | 7/1959 | Helfaer | 260—281 |

FOREIGN PATENTS

| | | |
|---|---|---|
| 805,247 | 12/1959 | Great Britain. |
| 828,052 | 2/1960 | Great Britain. |

OTHER REFERENCES

Hackh's Chemical Dictionary, page 541, 3rd ed., The Blakiston Co., Philadelphia (1944).

Herbst et al.: Organic Syntheses, vol. XIX, pp. 6–9 (1939).

Lange's Handbook of Chemistry, 9th ed., pages 383–384, 508 to 509, 536–537 and 721, Handbook Publishers, Inc. Sandusky, Ohio (1956).

Liebermann: Annalen, vol. 518 pp. 245–9 (1935).

MacArdle: "Use of Solvents," pages 151 to 155, D. Van Nostrand Co. (New York) (1925).

Perry: "Chem. Engineers Handbook" (3rd ed.), p. 1054 (1950).

Uhlig: Angewante Chemie, vol. 66, pp. 435–6 (1954).

NICHOLAS S. RIZZO, *Primary Examiner.*

DUVAL T. McCUTCHEN, IRVING MARCUS, WALTER A. MODANCE, *Examiners.*

DONALD DAUS, *Assistant Examiner.*